US012626972B2

(12) United States Patent
Ishihara et al.

(10) Patent No.: US 12,626,972 B2
(45) Date of Patent: May 12, 2026

(54) HEAT EXCHANGER

(71) Applicant: HONDA MOTOR CO., LTD., Tokyo (JP)

(72) Inventors: Yuya Ishihara, Wako (JP); Masataka Yoshida, Wako (JP); Tadahiro Fukushima, Wako (JP); Hiromitsu Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 699 days.

(21) Appl. No.: 18/148,065

(22) Filed: Dec. 29, 2022

(65) Prior Publication Data

US 2023/0223618 A1 Jul. 13, 2023

(30) Foreign Application Priority Data

Jan. 7, 2022 (JP) ................................. 2022-001533

(51) Int. Cl.
| | |
|---|---|
| *H01M 10/6568* | (2014.01) |
| *H01M 10/613* | (2014.01) |
| *H01M 10/625* | (2014.01) |
| *H01M 10/647* | (2014.01) |
| *H01M 10/6551* | (2014.01) |
| *H01M 10/6554* | (2014.01) |

(Continued)

(52) U.S. Cl.
CPC ..... *H01M 10/6568* (2015.04); *H01M 10/613* (2015.04); *H01M 10/625* (2015.04); *H01M 10/647* (2015.04); *H01M 10/6551* (2015.04); *H01M 10/6554* (2015.04); *H01M 10/6556* (2015.04); *H01M 10/6567* (2015.04); *H01M 2220/20* (2013.01)

(58) Field of Classification Search
None
See application file for complete search history.

(56) References Cited

U.S. PATENT DOCUMENTS

| | | | | |
|---|---|---|---|---|
| 8,673,473 | B2 * | 3/2014 | Odumodu | ............ H01M 50/211 |
| | | | | 429/162 |
| 9,196,935 | B2 * | 11/2015 | Han | .................... H01M 10/613 |

(Continued)

FOREIGN PATENT DOCUMENTS

| | | |
|---|---|---|
| JP | 2009-9853 A | 1/2009 |
| JP | 2012-33486 A | 2/2012 |

(Continued)

OTHER PUBLICATIONS

Japanese Office Action dated Oct. 7, 2025 issued in corresponding Japanese application No. 2022-001533; English machine translation included (6 pages).

*Primary Examiner* — Scott J. Chmielecki

(74) *Attorney, Agent, or Firm* — Rankin, Hill & Clark LLP

(57) ABSTRACT

A heat exchanger for cooling battery cells includes a plurality of first heat exchange plates each including a first water jacket, and a plurality of second heat exchange plates each including a second water jacket. A second water supply inlet is disposed on the opposite side of the first water jacket and the second water jacket from a first water supply inlet in the flow direction, and a second water discharge outlet is disposed on the opposite side of the first water jacket and the second water jacket from a first water discharge outlet in the flow direction.

6 Claims, 15 Drawing Sheets

(51) Int. Cl.
    *H01M 10/6556*     (2014.01)
    *H01M 10/6567*     (2014.01)

(56)           References Cited

U.S. PATENT DOCUMENTS

| | | | | |
|---|---|---|---|---|
| 2009/0325059 A1* | 12/2009 | Niedzwiecki | H01M 50/211 | 429/152 |
| 2010/0143782 A1* | 6/2010 | Kruger | H01M 10/6557 | 429/120 |
| 2011/0027625 A1* | 2/2011 | Payne | H01M 6/5038 | 429/50 |
| 2012/0028156 A1 | 2/2012 | Song et al. | | |
| 2012/0129024 A1* | 5/2012 | Marchio | H01M 10/647 | 429/120 |
| 2013/0071699 A1* | 3/2013 | Heise | H01M 10/6567 | 429/50 |
| 2013/0143093 A1* | 6/2013 | Teng | H01M 10/651 | 429/120 |
| 2013/0244077 A1* | 9/2013 | Palanchon | H01M 10/61 | 429/120 |
| 2013/0280564 A1 | 10/2013 | Zheng et al. | | |
| 2014/0050952 A1* | 2/2014 | Merriman | H01M 10/6556 | 429/72 |
| 2014/0050953 A1* | 2/2014 | Yoon | H01M 10/647 | 429/82 |
| 2014/0308551 A1* | 10/2014 | Schroeder | B60L 1/003 | 429/81 |
| 2015/0072194 A1* | 3/2015 | Schmieder | H01M 50/529 | 429/88 |
| 2015/0140366 A1 | 5/2015 | Nicholls | | |
| 2017/0077565 A1* | 3/2017 | Burrows | H01M 10/613 | |
| 2017/0122679 A1* | 5/2017 | Kenney | F28F 3/10 | |
| 2017/0194681 A1* | 7/2017 | Kim | H01M 50/105 | |
| 2017/0222284 A1* | 8/2017 | Ottomano | H01M 10/6553 | |
| 2017/0237130 A1* | 8/2017 | Kim | H01M 10/6556 | 429/120 |
| 2021/0151821 A1* | 5/2021 | Shim | H01M 10/613 | |

FOREIGN PATENT DOCUMENTS

| | | | | |
|---|---|---|---|---|
| JP | 2013-48083 A | 3/2013 | | |
| JP | 2013-089577 A | 5/2013 | | |
| JP | 2013-545219 A | 12/2013 | | |
| JP | 2014-509436 A | 4/2014 | | |
| JP | 2015-527688 A | 9/2015 | | |
| JP | 2021-106107 A | 7/2021 | | |
| WO | WO-2010069872 A1 * | 6/2010 | | F28F 3/046 |

* cited by examiner

FIG. 13

HEAT EXCHANGER

CROSS-REFERENCE TO RELATED APPLICATIONS

This application is based upon and claims the benefit of priority from Japanese Patent Application No. 2022-001533 filed on Jan. 7, 2022, the contents of which are incorporated herein by reference.

BACKGROUND OF THE INVENTION

Field of the Invention

The present invention relates to a heat exchanger.

Description of the Related Art

JP 2013-089577 A discloses a heat exchanger for cooling battery cells. In the heat exchanger, a plurality of heat exchange plates are stacked. Cooling water flows inside each heat exchange plate. Battery cells are provided between the stacked heat exchange plates.

SUMMARY OF THE INVENTION

In the heat exchanger disclosed in JP 2013-089577 A, in each heat exchange plate, a variation occurs in the temperature of the cooling water flowing inside the heat exchange plate between an upstream region and a downstream region. Therefore, there is a possibility that the battery cell cannot be sufficiently cooled depending on a region where the battery cell is in contact with each heat exchange plate. In this case, there is a problem in that the discharge performance and durability of the battery cell are reduced.

An object of the present invention is to solve the above-mentioned problem.

According to an aspect of the present invention, provided is a heat exchanger that cools a battery cell, the heat exchanger comprising: a plurality of first heat exchange plates each including a first water jacket through which cooling water flows; and a plurality of second heat exchange plates each including a second water jacket through which the cooling water flows, wherein each of the first heat exchange plates and each of the second heat exchange plates are alternately stacked, the cooling water flows inside the first water jacket and inside the second water jacket in a flow direction that is orthogonal to a stacking direction of the first heat exchange plates and the second heat exchange plates, each of the first heat exchange plates includes a first water supply inlet configured to supply the cooling water to the first water jacket, and a first water discharge outlet configured to discharge the cooling water from the first water jacket, each of the second heat exchange plates includes a second water supply inlet configured to supply the cooling water to the second water jacket, and a second water discharge outlet configured to discharge the cooling water from the second water jacket, the second water supply inlet is disposed on an opposite side of the first water jacket and the second water jacket from the first water supply inlet in the flow direction, and the second water discharge outlet is disposed on an opposite side of the first water jacket and the second water jacket from the first water discharge outlet in the flow direction.

According to the present invention, a decrease in discharge performance and durability of a battery cell can be suppressed.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 13 is a schematic cross-sectional view of a first water supply inlet;

DETAILED DESCRIPTION OF THE INVENTION

First Embodiment

[Configuration of Battery Module]

Figure 1:
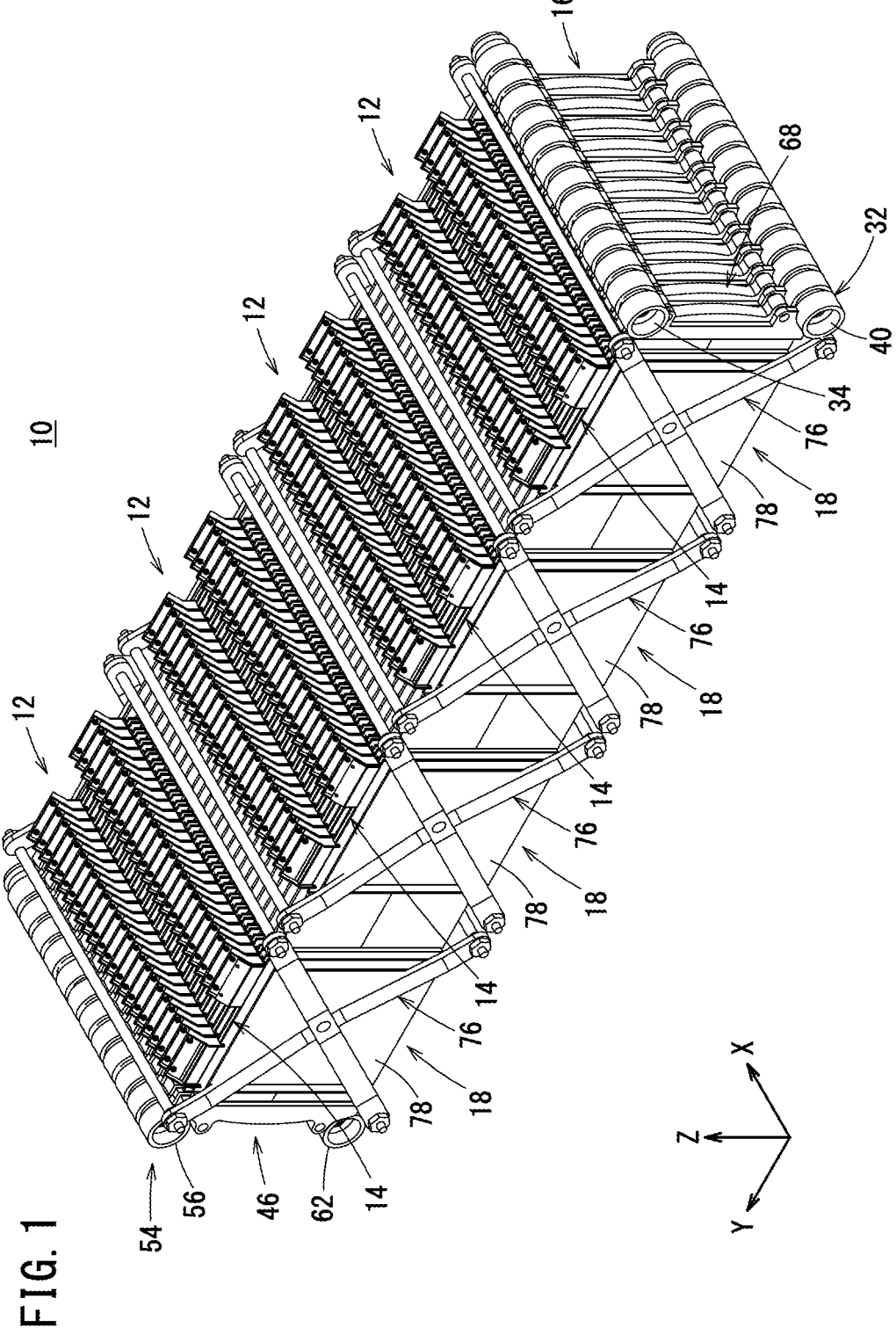
FIG. 1 is a perspective view of a battery module.

FIG. 1 is a perspective view of a battery module 10. In the following description of the structure of each member constituting the battery module 10, the description will be made using the directions and orientations of the X axis, the Y axis, and the Z axis indicated by the arrows in FIG. 1. Arrows indicating the X-axis, the Y-axis, and the Z-axis are also illustrated in the drawings other than FIG. 1, which will be described later. The directions and orientations of the X-axis, the Y-axis, and the Z-axis indicated by the arrows in the drawings other than FIG. 1 correspond to the directions and orientations of the X-axis, the Y-axis, and the Z-axis indicated by the arrows in FIG. 1.

The battery module 10 includes four battery cell stacks 12. The four battery cell stacks 12 are arranged in the Y-axis direction in a state where the longitudinal direction of each battery cell stack 12 is oriented in the X-axis direction. Each battery cell stack 12 includes a plurality of battery cells 14. In each battery cell stack 12, the plurality of battery cells 14 are stacked side by side in the X-axis direction. That is, the stacking direction of the battery cells 14 is the same as the X-axis direction. The battery cells 14 are stacked in the thickness direction thereof. In each battery cell stack 12, each battery cell 14 is connected in series with another battery cell 14.

The battery module 10 includes a heat exchanger 16. The heat exchanger 16 cools each battery cell 14.

The battery module 10 includes four battery frames 18. Each battery frame 18 holds each battery cell stack 12. Each battery frame 18 applies pressure to the battery cell stack 12 from both sides in the X-axis direction. Thus, expansion of each battery cell 14 is suppressed.

[Configuration of Battery Cell]

Figure 2:
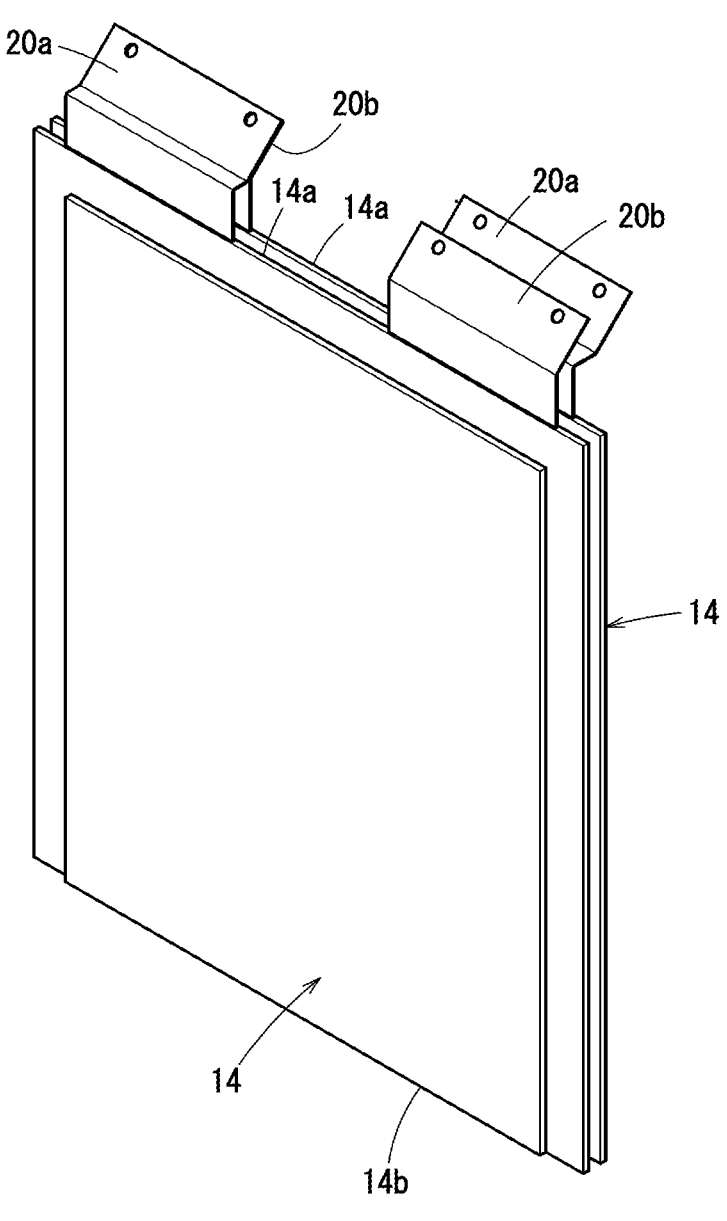
FIG. 2 is a perspective view of a battery cell.
Figure 2:
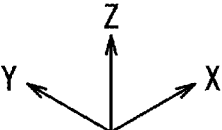

FIG. 2 is a perspective view of the battery cell 14. FIG. 2 shows a state in which two battery cells 14 are stacked.

The battery cell 14 is a laminated battery. The battery cell 14 is formed in a rectangular plate shape. The battery cell 14 is provided with a positive electrode tab 20a and a negative electrode tab 20b. The positive electrode tab 20a and the negative electrode tab 20b are provided on a first side 14a of a plurality of sides of the battery cell 14. The positive electrode tab 20a is formed in a rectangular plate shape. The negative electrode tab 20b is formed in a rectangular plate shape.

[Configuration of Heat Exchanger]

Figure 3:
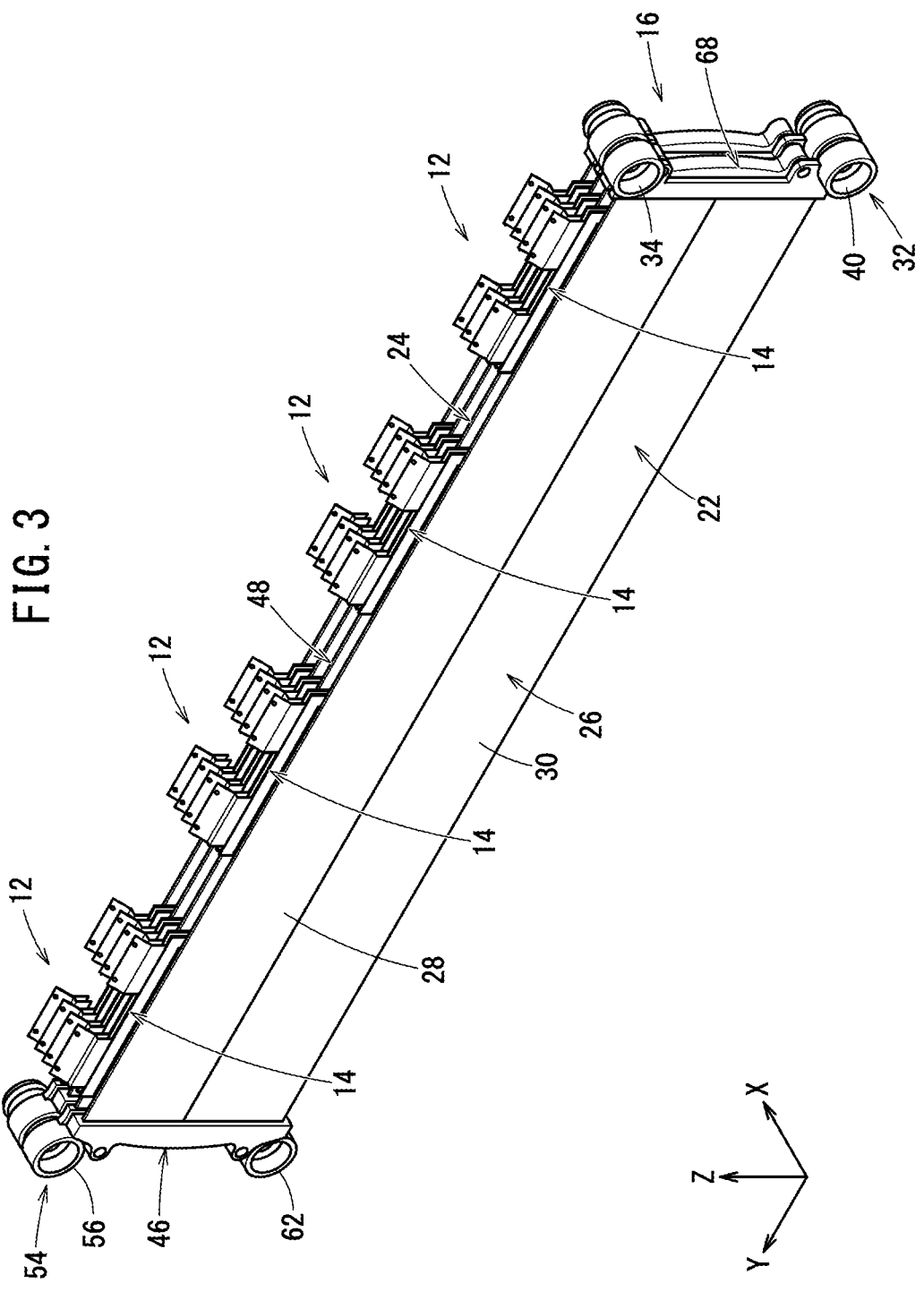
FIG. 3 is a perspective view of a battery cell stack and a heat exchanger.
Figure 4:
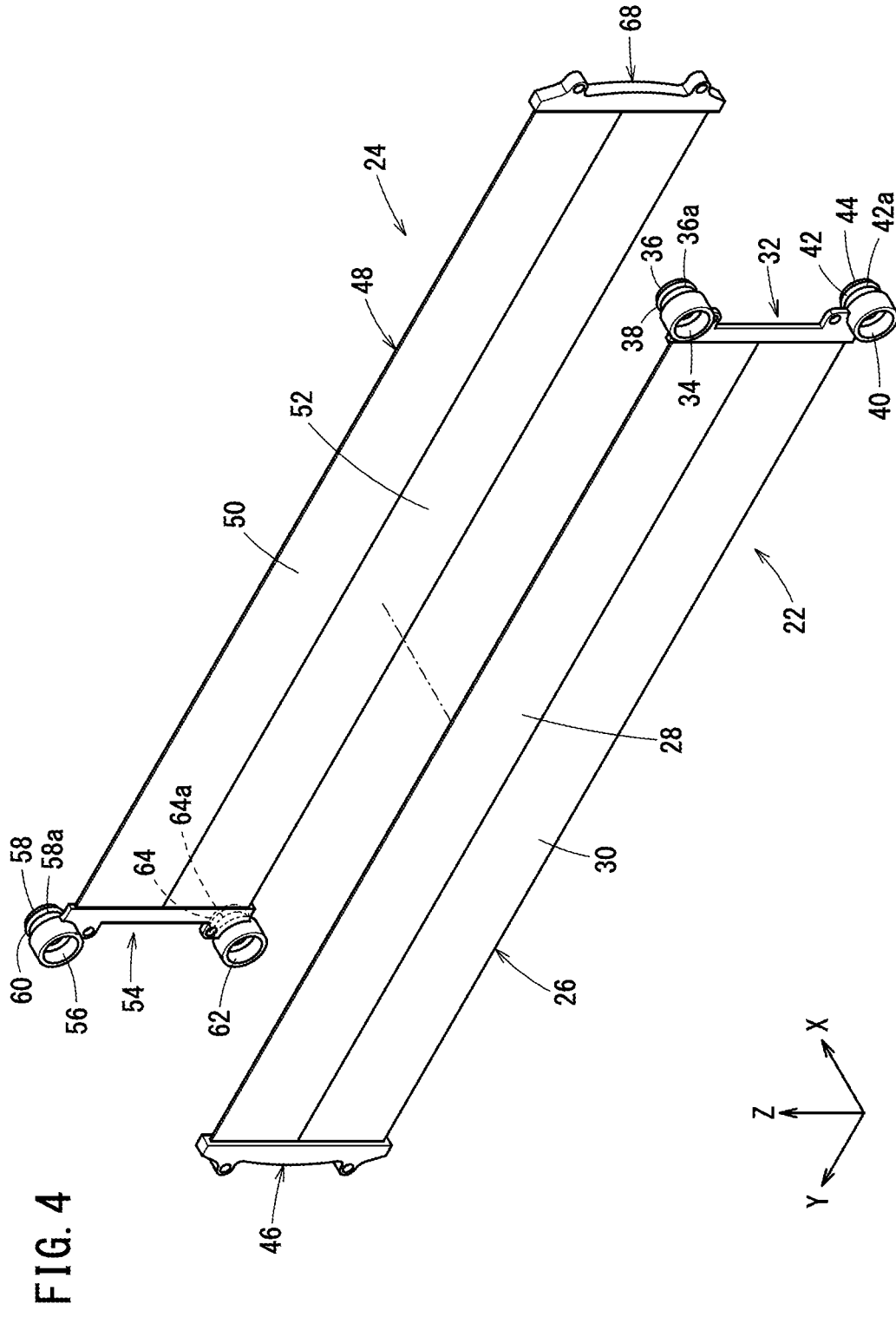
FIG. 4 is a perspective view of a first heat exchange plate and a second heat exchange plate.
Figure 5:
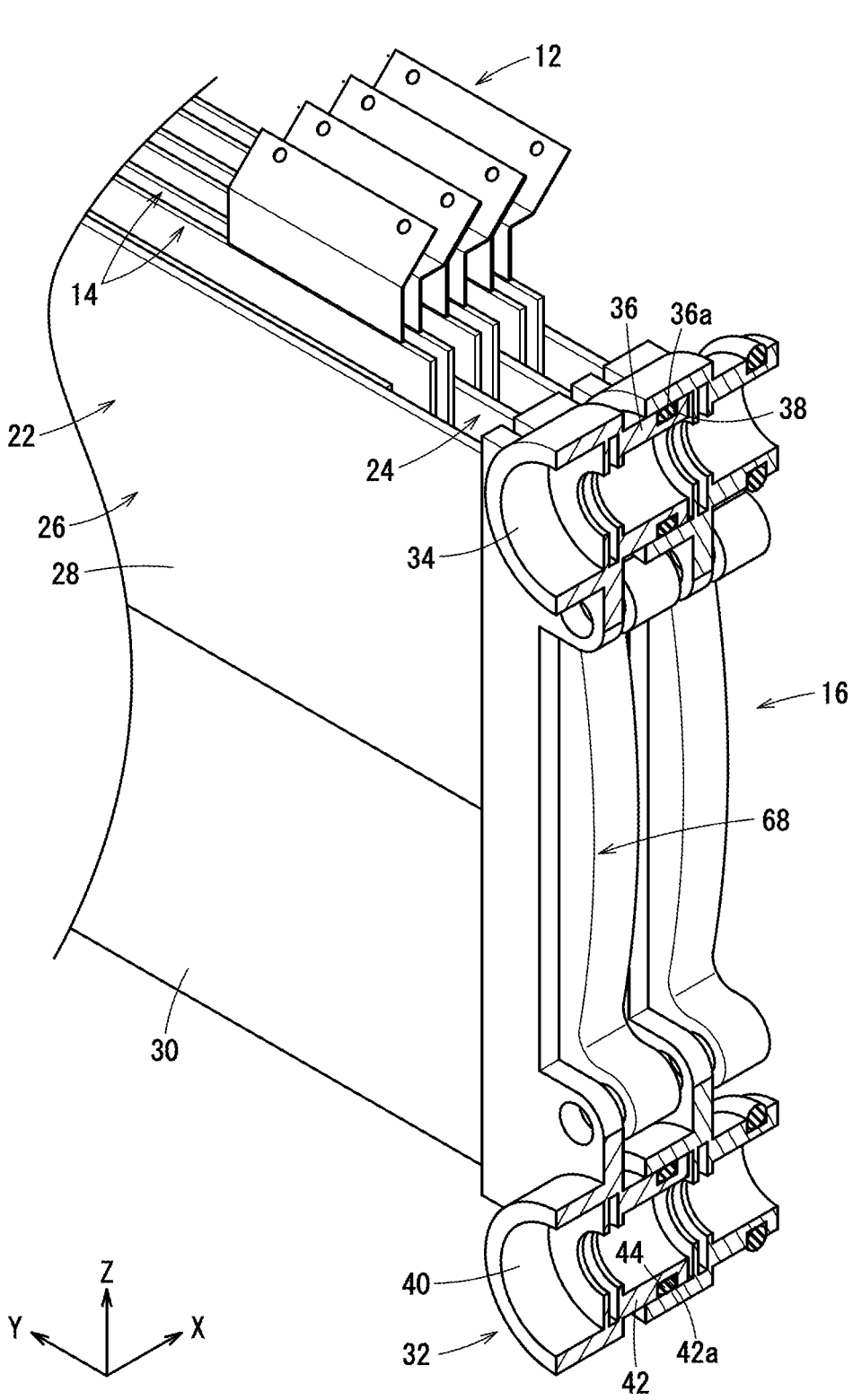
FIG. 5 is a cross-sectional perspective view of the battery cell stack and the heat exchanger.
Figure 6:
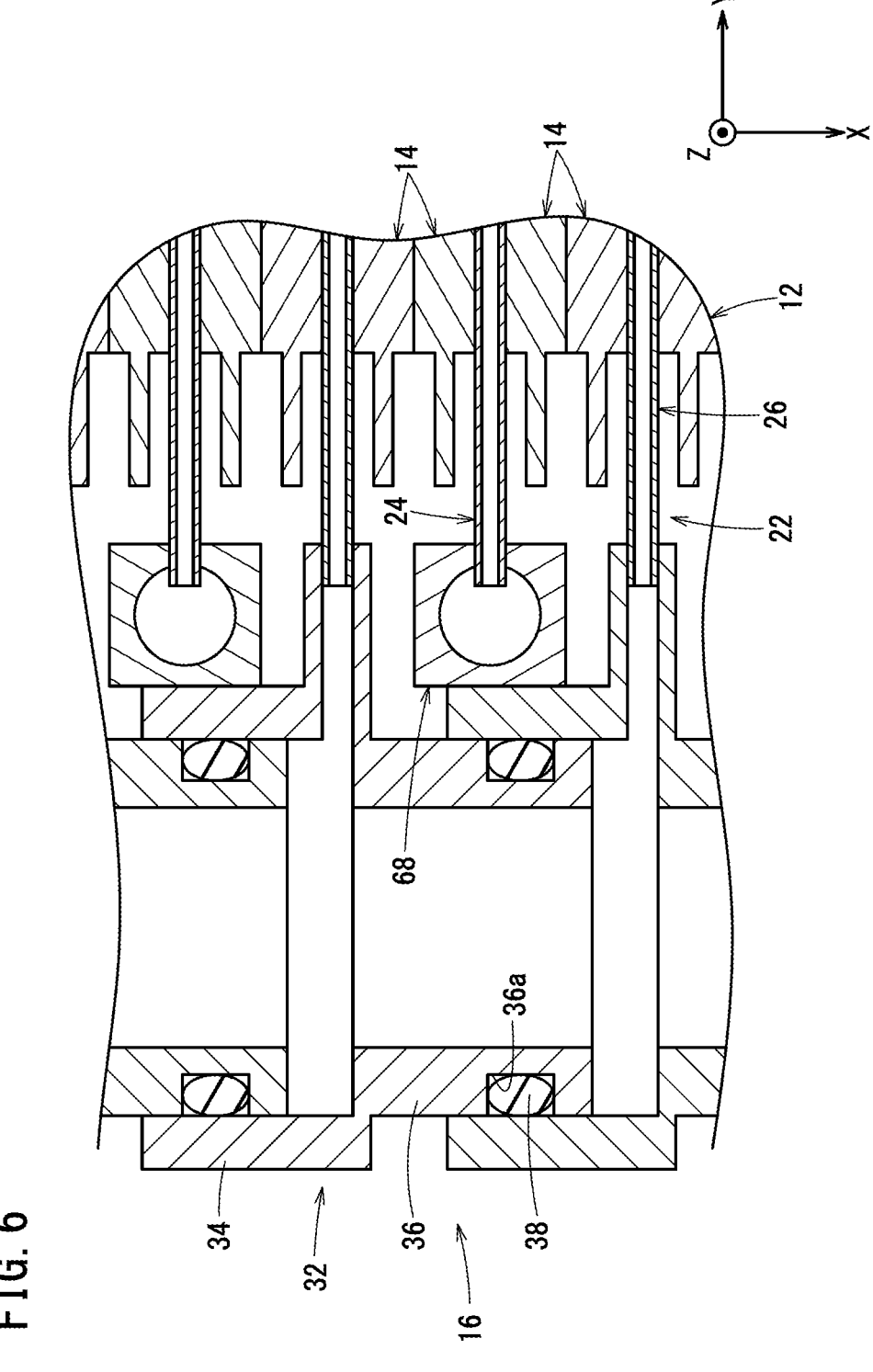
FIG. 6 is a cross-sectional view of the battery cell stack and the heat exchanger.

FIG. 3 is a perspective view of the battery cell stack 12 and the heat exchanger 16. In FIG. 3, a part of the battery cell stack 12 and a part of the heat exchanger 16 are illustrated. FIG. 4 is a perspective view of a first heat exchange plate 22 and a second heat exchange plate 24. FIG. 5 is a cross-sectional perspective view of the battery cell stack 12 and the heat exchanger 16. In FIG. 5, a part of the battery cell stack 12 and a part of the heat exchanger 16 are illustrated. FIG. 6 is a cross-sectional view of the battery cell stack 12 and the heat exchanger 16. In FIG. 6, a part of the battery cell stack 12 and a part of the heat exchanger 16 are illustrated.

The heat exchanger 16 includes a plurality of the first heat exchange plates 22 and a plurality of the second heat exchange plates 24. The plurality of first heat exchange plates 22 and the plurality of second heat exchange plates 24 are stacked side by side in the X-axis direction. The plurality of first heat exchange plates 22 and the plurality of second heat exchange plates 24 are stacked in the thickness direction of the first heat exchange plates 22 and the thickness direction of the second heat exchange plates 24. The plurality of first heat exchange plates 22 and the plurality of second heat exchange plates 24 are configured such that the first heat exchange plate 22 and the second heat exchange plate 24 are alternately stacked.

The structure of the second heat exchange plate 24 is the same as that of the first heat exchange plate 22. In the heat exchanger 16, the direction in which the first heat exchange plate 22 is disposed is different from the direction in which the second heat exchange plate 24 is disposed.

The first heat exchange plate 22 includes a first water jacket 26. The longitudinal direction of the first water jacket 26 extends in the Y-axis direction. The first water jacket 26 includes a first forward flow path 28 and a first return flow path 30. In the Z-axis direction, the first forward flow path 28 is provided on the Z-axis positive side of the center of the first water jacket 26. In the Z-axis direction, the first return flow path 30 is provided on the Z-axis negative side of the center of the first water jacket 26. Cooling water flows inside the first forward flow path 28. The cooling water flows through the first forward flow path 28 from the negative side in the Y-axis direction toward the positive side in the Y-axis direction. The cooling water flows inside the first return flow path 30. The cooling water flows through the first return flow path 30 from the positive side in the Y-axis direction toward the negative side in the Y-axis direction. That is, the Y-axis direction is the same as the flow direction in which the cooling water flows inside the first water jacket 26.

The first heat exchange plate 22 includes a first water supply/discharge header 32. The first water supply/discharge header 32 is attached to an end portion of the first water jacket 26 on the negative side in the Y axis direction. The first water supply/discharge header 32 includes a first water supply inlet 34 for supplying cooling water to the first forward flow path 28. The first water supply inlet 34 includes a first water supply connection portion 36. The first water supply connection portion 36 is inserted into the first water supply inlet 34 of another first heat exchange plate 22 located on the positive side in the X-axis direction. The first water supply connection portion 36 includes a seal groove 36a. A seal member 38 is attached to the seal groove 36a. The first water supply/discharge header 32 includes a first water discharge outlet 40 for discharging the cooling water from the first return flow path 30. In the Y-axis direction, the first water discharge outlet 40 is disposed on the same side of the first water jacket 26 as the first water supply inlet 34. The first water discharge outlet 40 includes a first water discharge connection portion 42. The first water discharge connection portion 42 is inserted into the first water discharge outlet 40 of another first heat exchange plate 22 located on the positive side in the X-axis direction. The first water discharge connection portion 42 includes a seal groove 42a. A seal member 44 is attached to the seal groove 42a.

The first heat exchange plate 22 includes a first turn header 46. The first turn header 46 is attached to an end portion of the first water jacket 26 on the positive side in the Y-axis direction. Thus, the first turn header 46 is disposed on the opposite side of the first water jacket 26 from the first water supply inlet 34 and the first water discharge outlet 40. The first turn header 46 causes the cooling water flowing from the first forward flow path 28 to flow to the first return flow path 30. The first turn header 46 is formed in a curved surface shape protruding toward the outer side of the first heat exchange plate 22 in the Y-axis direction. As a result, the first turn header 46 can smoothly change the direction of flow of the cooling water flowing from the first forward flow path 28 and cause the cooling water to flow to the first return flow path 30.

The second heat exchange plate 24 includes a second water jacket 48. The longitudinal direction of the second water jacket 48 extends in the Y-axis direction. The second water jacket 48 includes a second forward flow path 50 and a second return flow path 52. In the Z-axis direction, the second forward flow path 50 is provided on the Z-axis positive side of the center of the second water jacket 48. In the Z-axis direction, the second return flow path 52 is provided on the Z-axis negative side of the center of the second water jacket 48. Cooling water flows inside the second forward flow path 50. The cooling water flows through the second forward flow path 50 from the positive side in the Y-axis direction toward the negative side in the Y-axis direction. The cooling water flows inside the second return flow path 52. The cooling water flows through the second return flow path 52 from the negative side in the Y-axis direction toward the positive side in the Y-axis direction. That is, the Y-axis direction is the same as the flow direction in which the cooling water flows inside the second water jacket 48.

The second heat exchange plate 24 includes a second water supply/discharge header 54. The second water supply/discharge header 54 is attached to an end portion of the second water jacket 48 on the positive side in the Y axis direction. The second water supply/discharge header 54 includes a second water supply inlet 56 for supplying cooling water to the second forward flow path 50. In the Y-axis direction, the second water supply inlet 56 is provided on the opposite side of the first water jacket 26 and the second water jacket 48 from the first water supply inlet 34.

The second water supply inlet 56 includes a second water supply connection portion 58. The second water supply connection portion 58 is inserted into the second water supply inlet 56 of another second heat exchange plate 24 located on the positive side in the X-axis direction. The second water supply connection portion 58 includes a seal groove 58a. A seal member 60 is attached to the seal groove 58a. The second water supply/discharge header 54 includes a second water discharge outlet 62 for discharging the cooling water from the second return flow path 52. In the Y-axis direction, the second water discharge outlet 62 is disposed on the same side of the second water jacket 48 as the second water supply inlet 56. In the Y-axis direction, the second water discharge outlet 62 is provided on the opposite side of the first water jacket 26 and the second water jacket 48 from the first water discharge outlet 40. The second water discharge outlet 62 includes a second water discharge connection portion 64. The second water discharge connection portion 64 is inserted into the second water discharge outlet 62 of another second heat exchange plate 24 located on the positive side in the X-axis direction. The second water discharge connection portion 64 includes a seal groove 64a. A seal member (not shown) is attached to the seal groove 64a.

The second heat exchange plate 24 includes a second turn header 68. The second turn header 68 is attached to an end portion of the second water jacket 48 on the negative side in the Y-axis direction. Thus, the second turn header 68 is disposed on the opposite side of the second water jacket 48 from the second water supply inlet 56 and the second water discharge outlet 62. The second turn header 68 causes the cooling water flowing from the second forward flow path 50 to flow to the second return flow path 52. The second turn header 68 is formed in a curved surface shape protruding toward the outer side of the second heat exchange plate 24 in the Y-axis direction. As a result, the second turn header 68 can smoothly change the direction of flow of the cooling water flowing from the second forward flow path 50 and cause the cooling water to flow to the second return flow path 52.

Figure 7:
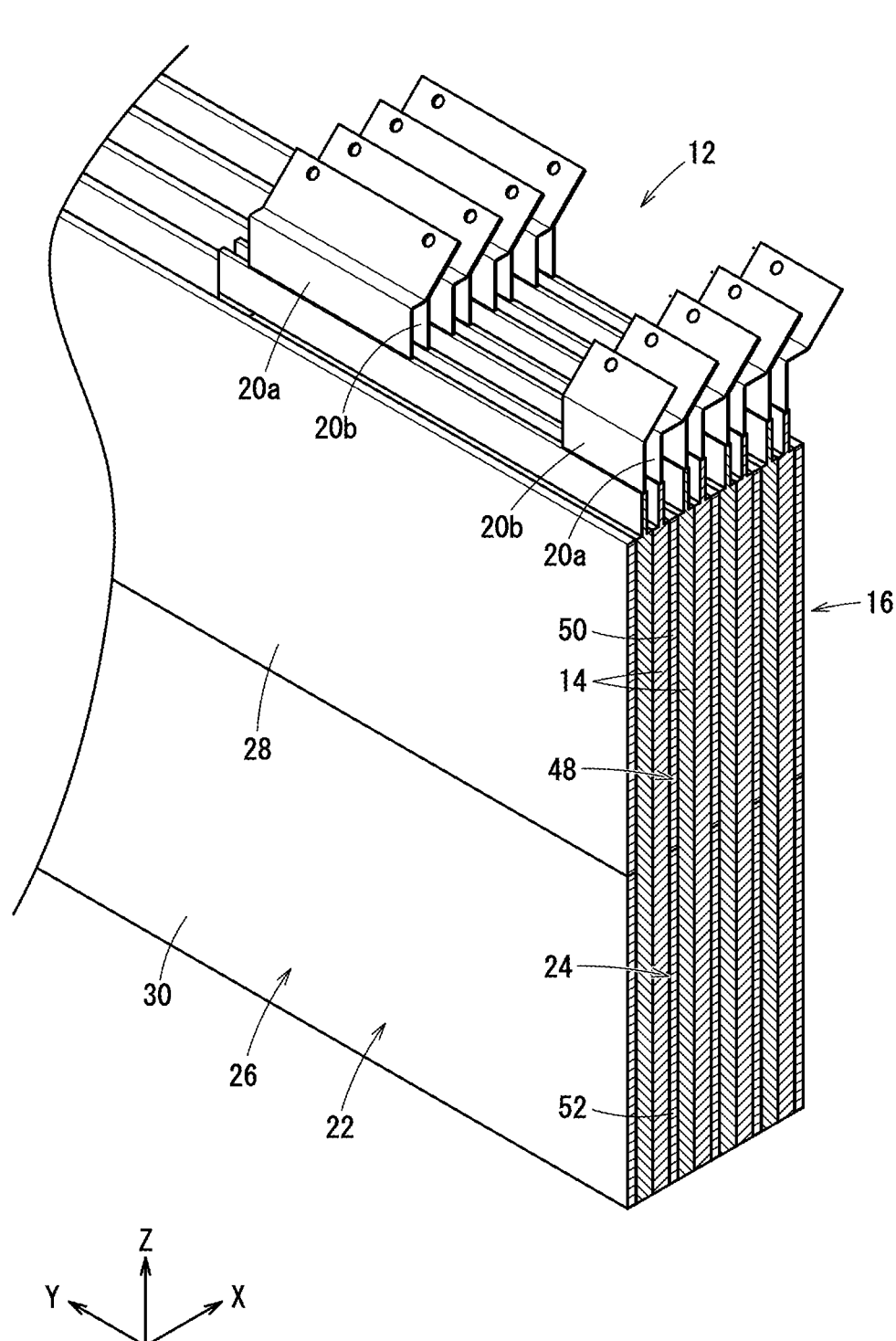
FIG. 7 is a cross-sectional perspective view of the battery cell stack and the heat exchanger.

FIG. 7 is a cross-sectional perspective view of the battery cell stack 12 and the heat exchanger 16. In FIG. 7, a part of the battery cell stack 12 and a part of the heat exchanger 16 are illustrated.

Two battery cells 14 are disposed between the first heat exchange plate 22 and the second heat exchange plate 24 in the X-axis direction. The two battery cells 14 are stacked in the thickness direction. Each of the outer surfaces of the two stacked battery cells 14 is in direct contact with the first water jacket 26 of the first heat exchange plate 22 or the second water jacket 48 of the second heat exchange plate 24. Each battery cell 14 is disposed between the first heat exchange plate 22 and the second heat exchange plate 24 in a state where the positive electrode tab 20a and the negative electrode tab 20b face the positive side in the Z-axis direction.

[Battery Cell Connection Structure]

Figure 8:
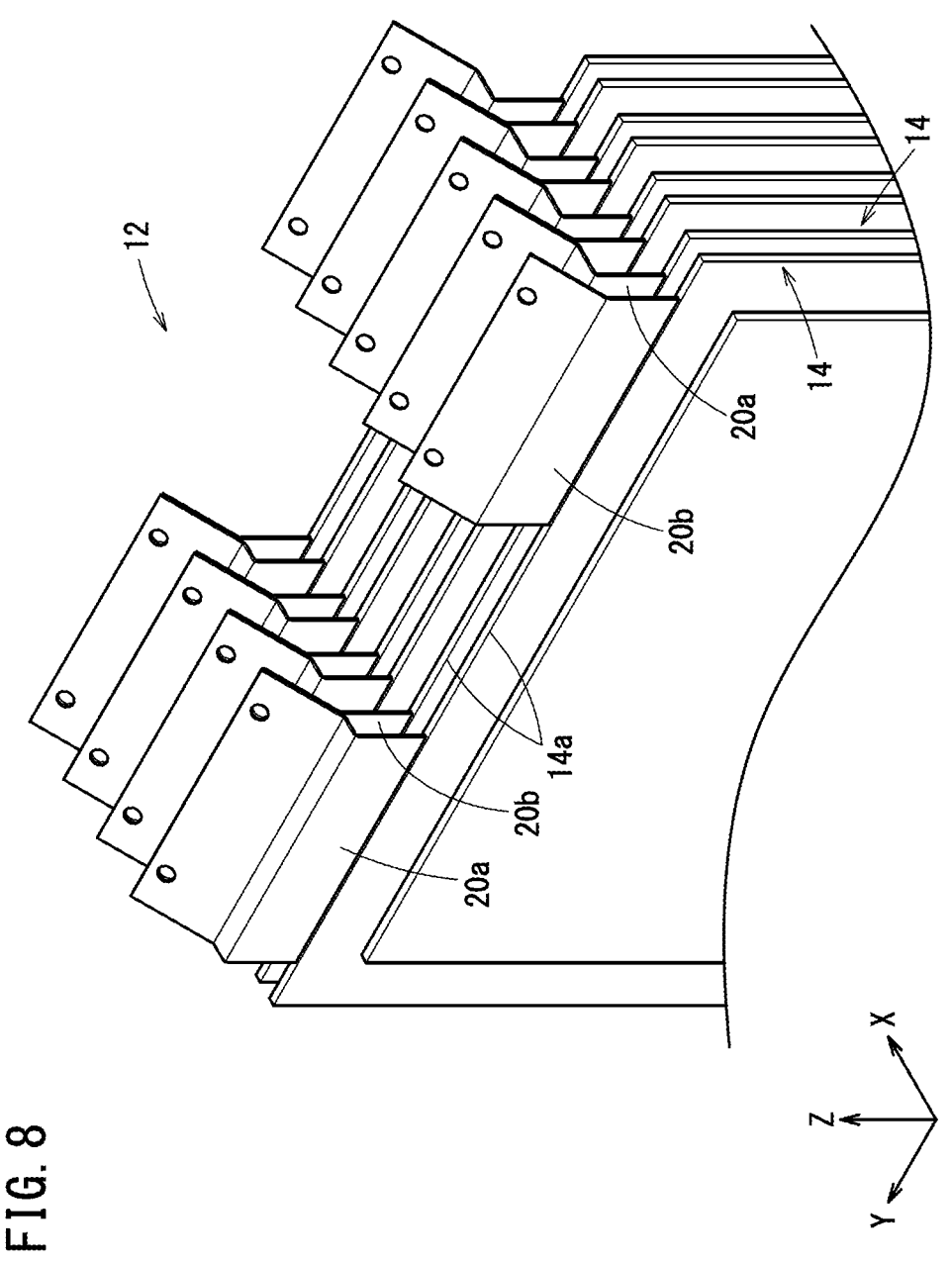
FIG. 8 is a perspective view of the battery cell stack.
Figure 9:
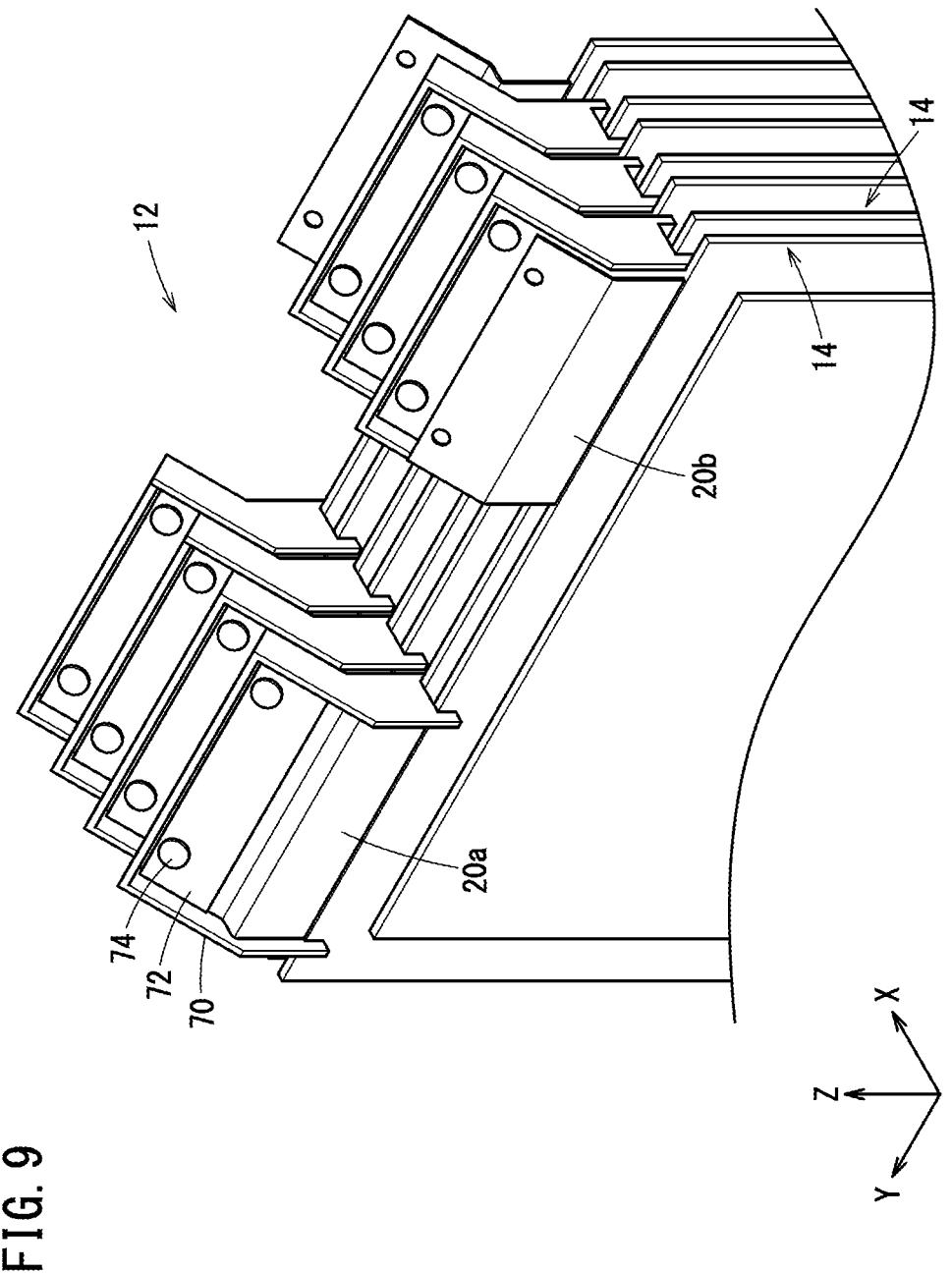
FIG. 9 is a perspective view of the battery cell stack.
Figure 10:
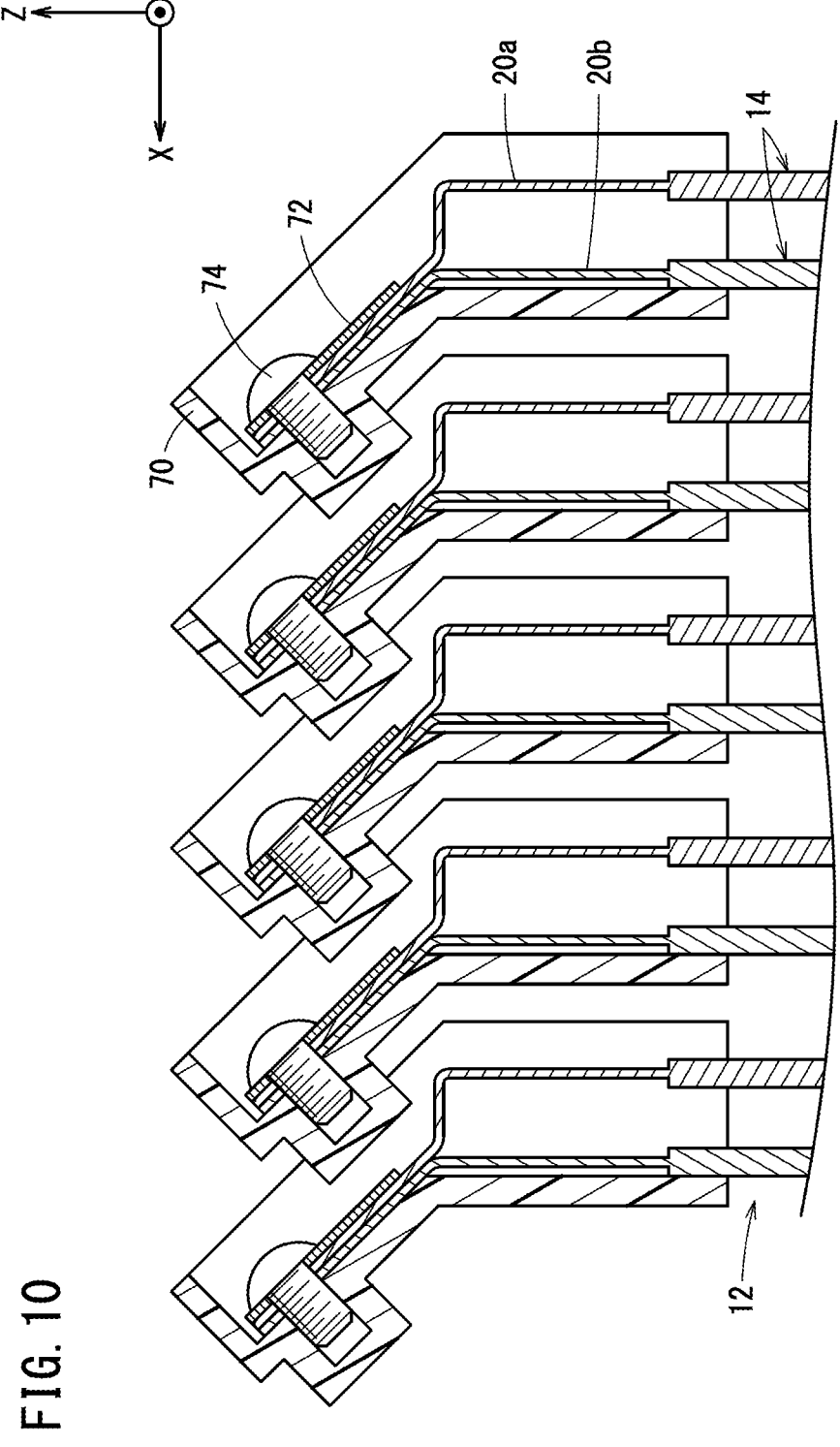
FIG. 10 is a cross-sectional view of the battery cell stack.

FIG. 8 is a perspective view of the battery cell stack 12. FIG. 9 is a perspective view of the battery cell stack 12. FIG. 10 is a cross-sectional view of the battery cell stack 12.

The positive electrode tab 20a of each battery cell 14 is connected to the negative electrode tab 20b of another adjacent battery cell 14 disposed on the positive side in the X-axis direction. The positive electrode tab 20a and the negative electrode tab 20b are stacked in the thickness direction. Each of the positive electrode tab 20a and the negative electrode tab 20b is bent to be inclined with respect to the X-axis direction. The X-axis direction is the same direction as the direction in which the battery cells 14 are stacked together. Each of the positive electrode tab 20a and the negative electrode tab 20b is bent to be inclined with respect to the Z-axis direction. The Z-axis direction is the same as the direction in which the first side 14a of each battery cell 14 and a second side 14b (FIG. 2) on the opposite side from the first side 14a are connected together.

In a state where the positive electrode tab 20a and the negative electrode tab 20b are sandwiched between a tab holder 70 and a retaining plate 72, the tab holder 70 and the retaining plate 72 are fastened to each other by screws 74.

[Configuration of Battery Frame]

Figure 11:
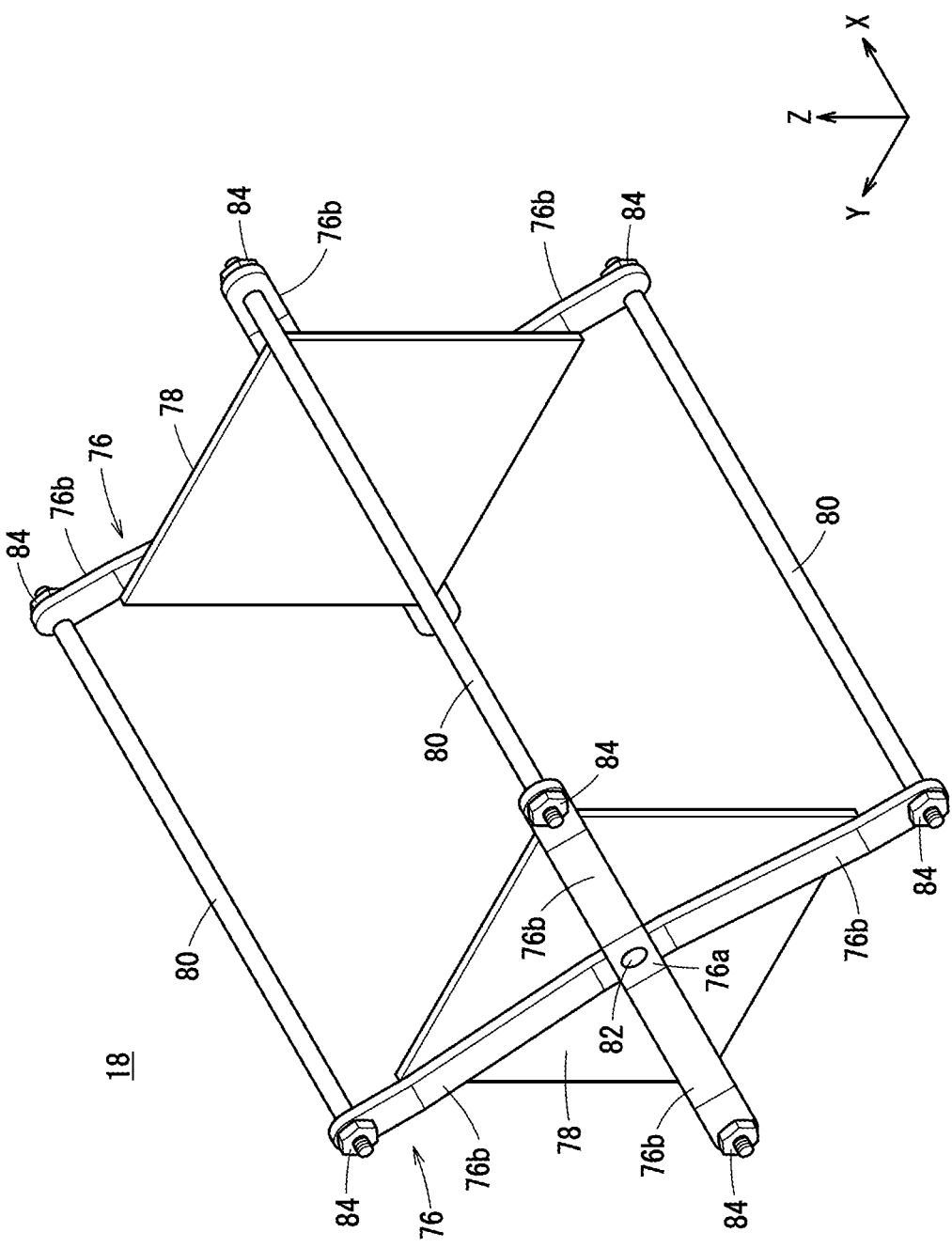
FIG. 11 is a perspective view of a battery frame.
Figure 12:
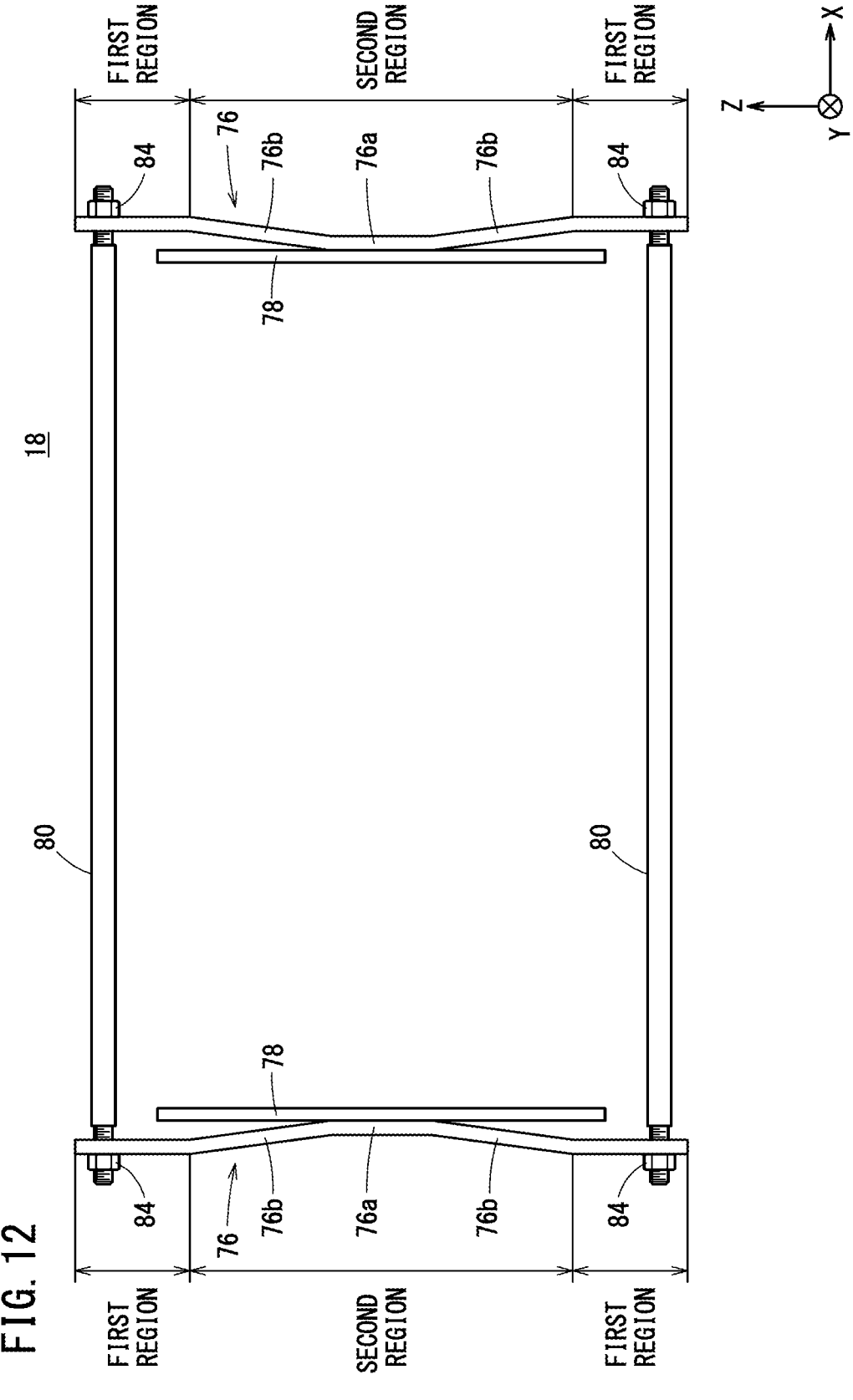
FIG. 12 is a side view of the battery frame.

FIG. 11 is a perspective view of the battery frame 18. FIG. 12 is a side view of the battery frame 18.

The battery frame 18 includes a pair of flat spring plates 76, a pair of pressing plates 78, and four connecting shafts 80.

The pair of pressing plates 78 are provided between the pair of flat spring plates 76. The battery cell stack 12 is provided between the pair of pressing plates 78 (FIG. 1). Each connecting shaft 80 extends in the X-axis direction. Each connecting shaft 80 connects the pair of flat spring plates 76.

Each flat spring plate 76 includes a central portion 76a and four arm portions 76b. Each arm portion 76b extends from the central portion 76a. Each arm portion 76b extends toward the outer side of the battery frame 18 in the X-axis direction so as to be oblique relative to the Z-axis direction.

Each flat spring plate 76 includes first regions and a second region. Each of the first region is a region of a tip portion of each arm portion 76b. The second region is a region other than the first regions. The second region includes the central portion 76a. In the X-axis direction, the second region is located on the further inward of the battery frame 18 than the first regions.

Each pressing plate 78 is attached to the central portion 76a of each flat spring plate 76. Each pressing plate 78 may be attached to the second region of the arm portions 76b of each flat spring plate 76. Each pressing plate 78 is attached to each flat spring plate 76 by a screw 82. Each pressing plate 78 may be attached to each flat spring plate 76 by welding.

In the Z-axis direction, the first regions of the arm portions 76b of each flat spring plate 76 overlap each pressing plate 78. In the Y-axis direction, the first regions of the arm portions 76b of each flat spring plate 76 overlap each pressing plate 78. The Z-axis direction and the Y-axis direction are the same as the direction orthogonal to the stacking direction of the battery cell stack 12.

The connecting shafts 80 are respectively attached to the first regions of the arm portions 76b of the flat spring plates 76. Adjustment bolts 84 are screwed into each connecting shaft 80 on the outer side of each flat spring plate 76. By tightening the adjustment bolts 84 in a state where the battery cell stack 12 is disposed between the pair of pressing plates 78, the pressure applied from the pair of pressing plates 78 to the battery cell stack 12 increases. By adjusting the amount of tightening of the adjustment bolts 84, the force applied to the battery cell stack 12 is set to 200 kPa to 400 kPa.

Advantageous Effects

Figure 13:
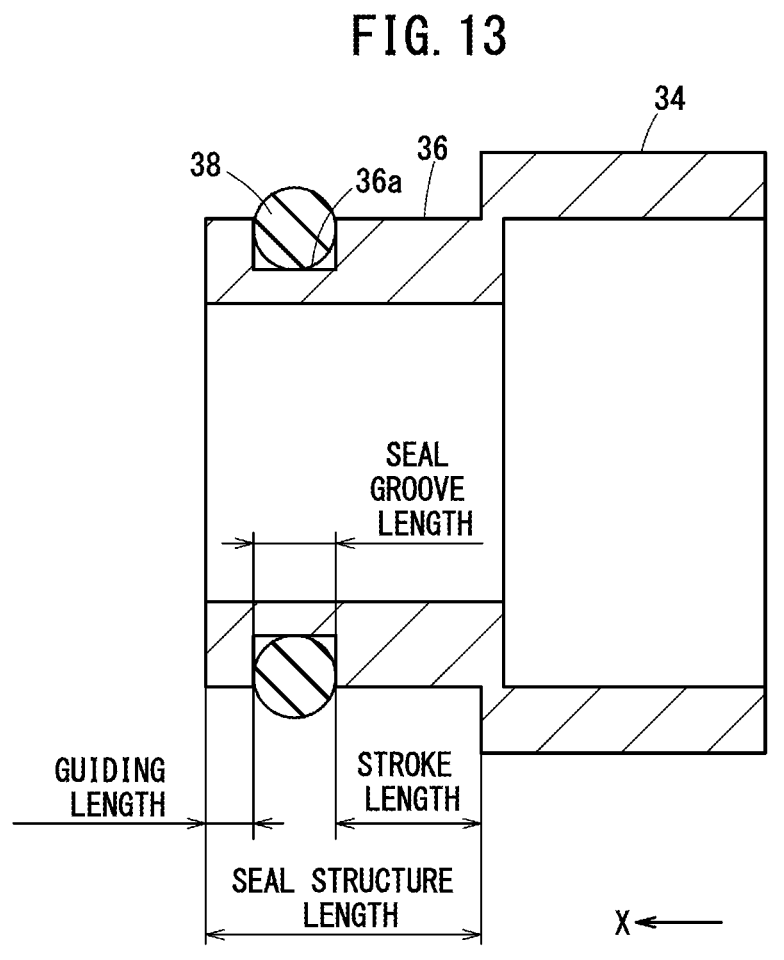

FIG. 13 is a schematic cross-sectional view of the first water supply inlet 34. A seal structure length of the first water supply connection portion 36 of the first water supply inlet 34 is secured in the X-axis direction. The seal structure length is the total length of the following three lengths. The first length is a guiding length. By providing the guiding length, it is possible to easily insert the first water supply connection portion 36 into another first water supply inlet 34. The second length is a seal groove length. The seal groove length is set in accordance with the diameter of the seal member. In addition, an insertion load required when the first water supply connection portion 36 is inserted into another first water supply inlet 34 is set in accordance with the seal groove length. The third length is a stroke length. By providing the stroke length, even when the distance between the adjacent first heat exchange plates 22 in the X-axis direction changes, it is possible to maintain a state in which the first water supply inlet 34 and another first water supply inlet 34 are connected. The distance between the adjacent first heat exchange plates 22 in the X-axis direction varies depending on the design error of the thickness of the battery cells 14. In addition, the battery cells 14 may expand during charging and discharging. Therefore, the distance between the adjacent first heat exchange plates 22 in the X-axis direction also changes when the battery cells 14 expand.

The first water supply connection portion 36 is inserted into another first water supply inlet 34. Therefore, the distance between the adjacent first water jackets 26 is equal to or greater than the seal structure length.

Figure 14:
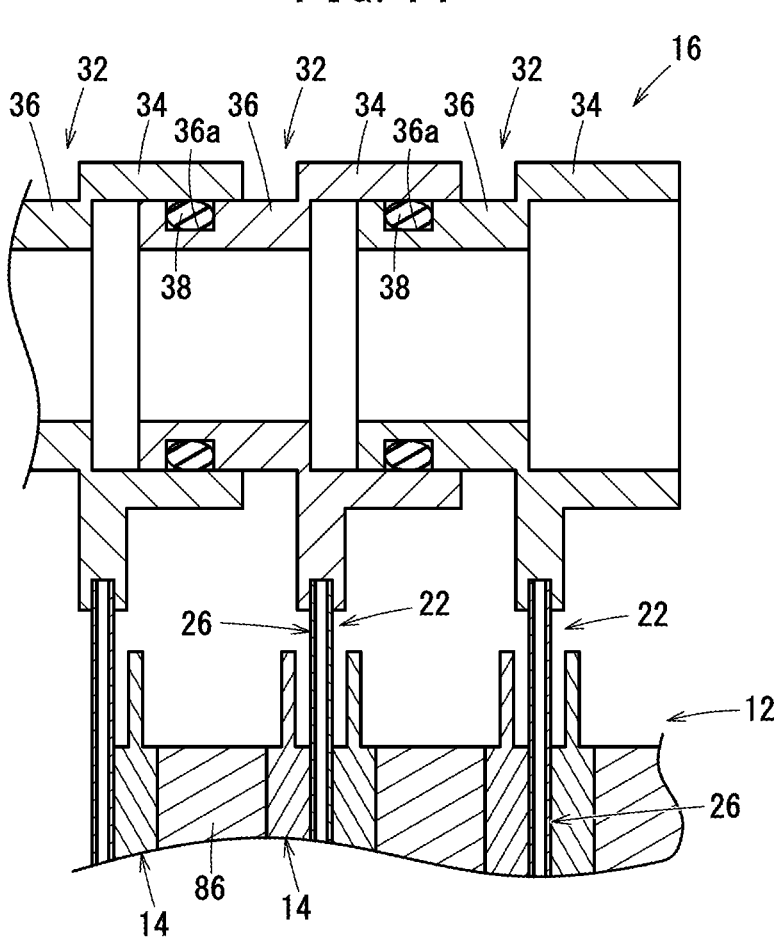
FIG. 14 is a schematic cross-sectional view of the heat exchanger.

FIG. 14 is a schematic cross-sectional view of the heat exchanger 16. FIG. 14 shows a comparative example with respect to the present embodiment. In the comparative example, the heat exchanger 16 does not include the second heat exchange plate 24. The battery cells 14 are disposed between the first heat exchange plate 22 and another first heat exchange plate 22.

The thickness of the battery cell 14, which is a laminated battery, is considerably smaller than the seal structure length. Even when two battery cells 14 are stacked, the thickness of the two battery cells 14 is smaller than the seal structure length. When a gap is formed between the battery cell 14 and the first water jacket 26, the battery cell 14 may not be sufficiently cooled. Therefore, it is necessary to interpose a shim 86 between the two battery cells 14 to bring each battery cell 14 and the first water jacket 26 into close contact with each other. However, since the shim 86 is added, there is a problem in that the manufacturing cost of the heat exchanger 16 increases. Further, since the shim 86 is added, there is a problem in that the weight of the heat exchanger 16 increases.

Figure 15:
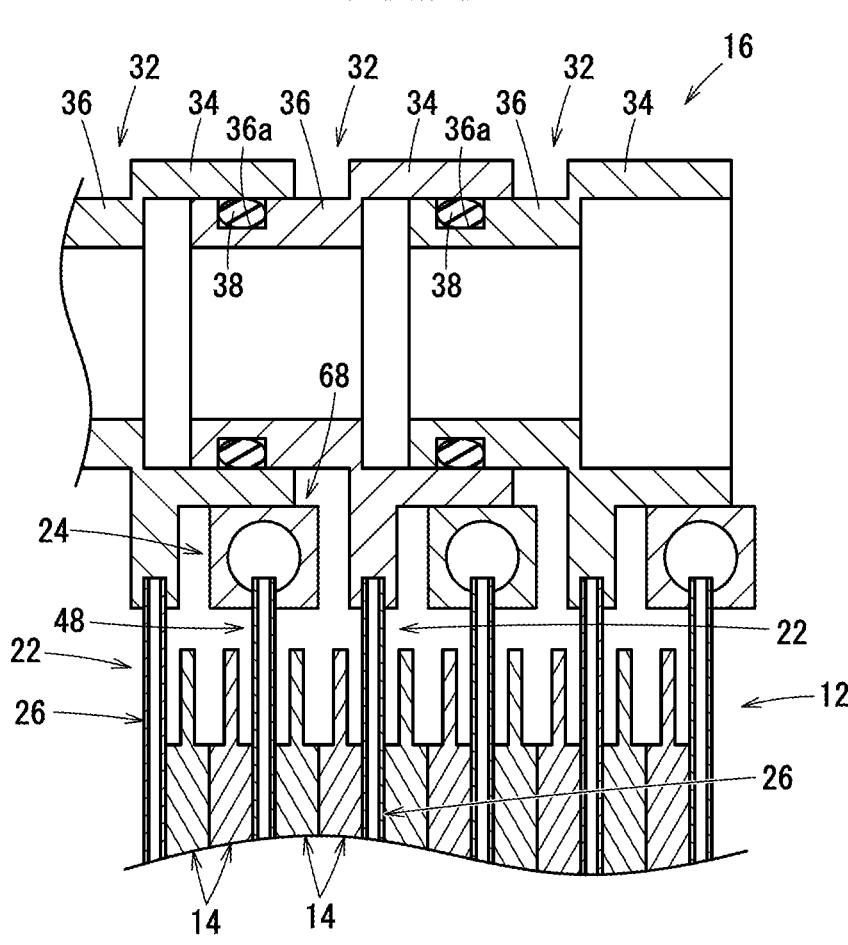
FIG. 15 is a schematic cross-sectional view of the heat exchanger.
Figure 15:
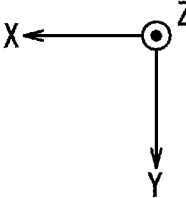

FIG. 15 is a schematic cross-sectional view of the heat exchanger 16. In the heat exchanger 16 of the present embodiment, the second heat exchange plate 24 is provided between two adjacent first heat exchange plates 22. Thus, one second heat exchange plate 24 and four battery cells 14 are provided between two adjacent first heat exchange plates 22 in the X-axis direction. The total length obtained by adding the thickness of one second water jacket 48 and the thickness of four battery cells 14 is greater than the seal structure length. Therefore, the battery cell 14 and the first water jacket 26 can be brought into close contact with each other, and the battery cell 14 and the second water jacket 48 can be brought into close contact with each other without adding the shim 86. As a result, an increase in the manufacturing cost of the heat exchanger 16 can be suppressed.

In the heat exchanger 16 of the present embodiment, cooling water is supplied to the first water jacket 26 of the first heat exchange plate 22 from the negative side in the Y-axis direction. Cooling water is supplied to the second water jacket 48 of the second heat exchange plate 24 from the positive side in the Y-axis direction. As a result, it is possible to suppress a variation in the cooling performance of the heat exchanger 16 depending on the location on each battery cell 14 inside the heat exchanger 16. As a result, discharge performance of the battery cells 14 can be improved. In addition, the durability of the battery cells 14 can be improved.

In the heat exchanger 16 of the present embodiment, the first turn header 46 of the first heat exchange plate 22 is formed in a curved surface shape protruding toward the outer side of the first heat exchange plate 22 in the Y-axis direction. As a result, the first turn header 46 can smoothly change the direction of flow of the cooling water flowing from the first forward flow path 28 and cause the cooling water to flow to the first return flow path 30. Therefore, it is possible to suppress occurrence of turbulence in the cooling water flowing inside the first turn header 46. As a result, resistance to the cooling water flowing inside the first turn header 46 can be suppressed.

The second turn header 68 of the second heat exchange plate 24 is formed in a curved surface shape protruding toward the outer side of the second heat exchange plate 24 in the Y-axis direction. As a result, the second turn header 68 can smoothly change the direction of flow of the cooling water flowing from the second forward flow path 50 and cause the cooling water to flow to the second return flow path 52. Therefore, it is possible to suppress occurrence of turbulence in the cooling water flowing inside the second turn header 68. As a result, resistance to the cooling water flowing inside the second turn header 68 can be suppressed.

In the heat exchanger 16 of the present embodiment, in the first water supply/discharge header 32 of the first heat exchange plate 22, the first water supply inlet 34 includes the first water supply connection portion 36. The first water supply connection portion 36 is inserted into the first water supply inlet 34 of the first water supply/discharge header 32 of another first heat exchange plate 22. As a result, it is possible to improve the sealing performance at the connecting portion between the first water supply inlet 34 and another first water supply inlet 34.

In the heat exchanger 16 of the present embodiment, in the first water supply/discharge header 32 of the first heat exchange plate 22, the first water discharge outlet 40 includes the first water discharge connection portion 42. The first water discharge connection portion 42 is inserted into the first water discharge outlet 40 of the first water supply/discharge header 32 of another first heat exchange plate 22. As a result, it is possible to improve the sealing performance at the connecting portion between the first water discharge outlet 40 and another first water discharge outlet 40.

In the heat exchanger 16 of the present embodiment, in the second water supply/discharge header 54 of the second heat exchange plate 24, the second water supply inlet 56 includes the second water supply connection portion 58. The second water supply connection portion 58 is inserted into the second water supply inlet 56 of the second water supply/discharge header 54 of another second heat exchange plate 24. As a result, it is possible to improve the sealing performance at the connecting portion between the second water supply inlet 56 and another second water supply inlet 56.

In the heat exchanger 16 of the present embodiment, in the second water supply/discharge header 54 of the second heat exchange plate 24, the second water discharge outlet 62 includes the second water discharge connection portion 64. The second water discharge connection portion 64 is inserted into the second water discharge outlet 62 of the second water supply/discharge header 54 of another second heat exchange plate 24. As a result, it is possible to improve the sealing performance at the connecting portion between the second water discharge outlet 62 and another second water discharge outlet 62.

During charging and discharging, the battery cell 14 generates heat. The positive electrode tab 20*a* and the negative electrode tab 20*b* are provided on the first side 14*a*. Therefore, in the Z-axis direction, with respect to the center of the battery cell 14, the temperature of the battery cell 14 in a region thereof close to the first side 14*a* is higher than the temperature of the battery cell 14 in a region thereof close to the second side 14*b*.

In the heat exchanger 16 of the present embodiment, in the Z-axis direction, the first forward flow path 28 is provided on the Z-axis positive side of the center of the first water jacket 26. In the Z-axis direction, the first return flow path 30 is provided on the Z-axis negative side of the center of the first water jacket 26. Thus, the region of the battery cell 14 that is close to the first side 14*a* comes into contact with the first forward flow path 28. The temperature of the cooling water flowing through the first forward flow path 28 is lower than the temperature of the cooling water flowing through the first return flow path 30. Therefore, it is possible to promote cooling of the region of the battery cell 14 that is close to the first side 14*a* and that has a high temperature.

In the heat exchanger 16 of the present embodiment, in the Z-axis direction, the second forward flow path 50 is provided on the Z-axis positive side of the center of the second water jacket 48. In the Z-axis direction, the second return flow path 52 is provided on the Z-axis negative side of the center of the second water jacket 48. Thus, the region of the battery cell 14 that is close to the first side 14*a* comes into contact with the second forward flow path 50. The temperature of the cooling water flowing through the second forward flow path 50 is lower than the temperature of the cooling water flowing through the second return flow path 52. Therefore, it is possible to promote cooling of the region of the battery cell 14 that is close to the first side 14*a* and that has a high temperature.

The present invention is not limited to the embodiment described above, and various configurations could be adopted therein without departing from the essence and gist of the present invention.

In the heat exchanger 16 of the first embodiment, the first water supply inlet 34 and the first water discharge outlet 40 are provided on the Y-axis direction negative side of the first water jacket 26. Instead, the first water supply inlet 34 may be provided on the Y-axis direction negative side of the first water jacket 26, and the first water discharge outlet 40 may be provided on the Y-axis direction positive side of the first water jacket 26.

In the heat exchanger 16 of the first embodiment, the second water supply inlet 56 and the second water discharge outlet 62 are provided on the Y-axis direction positive side of the second water jacket 48. Instead, the second water supply inlet 56 may be provided on the Y-axis direction positive side of the second water jacket 48, and the second water discharge outlet 62 may be provided on the Y-axis direction negative side of the second water jacket 48.

Invention Obtained from Embodiment

The invention that can be grasped from the above embodiment will be described below.

The heat exchanger (16) that cools the battery cell (14) includes: the plurality of first heat exchange plates (22) each including the first water jacket (26) through which cooling water flows; and the plurality of second heat exchange plates (24) each including the second water jacket (48) through which the cooling water flows, wherein each of the first heat exchange plates and each of the second heat exchange plates are alternately stacked, the cooling water flows inside the first water jacket and inside the second water jacket in a flow direction orthogonal to the stacking direction of the first heat exchange plates and the second heat exchange plates, each of the first heat exchange plates includes the first water supply inlet (34) configured to supply the cooling water to the first water jacket, and the first water discharge outlet (40) configured to discharge the cooling water from the first water jacket, each of the second heat exchange plates includes the second water supply inlet (56) configured to supply the cooling water to the second water jacket, and the second water discharge outlet (62) configured to discharge the cooling water from the second water jacket, the second water supply inlet is provided on the opposite side of the first water jacket and the second water jacket from the first water supply inlet in the flow direction, and the second water discharge outlet is disposed on the opposite side of the first water jacket and the second water jacket from the first water discharge outlet in the flow direction. Thus, without providing a shim between the battery cells, the battery cell and the first water jacket can be brought into close contact with each other, and the battery cell and the second water jacket can be brought into close contact with each other. As a result, an increase in the manufacturing cost of the heat exchanger can be suppressed. In addition, it is possible to suppress a variation in the cooling performance of the heat exchanger depending on the location on each battery cell inside the heat exchanger. As a result, the discharge performance of the battery cells can be improved. In addition, the durability of the battery cells can be improved.

In the above heat exchanger, the first water discharge outlet may be disposed on the same side of the first water jacket as the first water supply inlet in the flow direction, the first heat exchange plates may each include the first turn header (46) configured to cause the cooling water flowing from the first water supply inlet to flow toward the first water discharge outlet, the first turn header may be disposed on the opposite side of the first water jacket from the first water supply inlet and the first water discharge outlet in the flow direction, the first turn header may be formed in a curved surface shape protruding toward the outer side of the first heat exchange plate in the flow direction, the second water discharge outlet may be disposed on the same side of the second water jacket as the second water supply inlet in the flow direction, the second heat exchange plates may each include the second turn header (68) configured to cause the cooling water flowing from the second water supply inlet to flow toward the second water discharge outlet, the second turn header may be disposed on the opposite side of the second water jacket from the second water supply inlet and the second water discharge outlet in the flow direction, and the second turn header may be formed in a curved surface shape protruding toward the outer side of the second heat exchange plate in the flow direction. Thus, it is possible to suppress occurrence of turbulence in the cooling water flowing inside the first turn header. As a result, resistance to the cooling water flowing inside the first turn header can be suppressed. Further, it is possible to suppress occurrence of turbulence in the cooling water flowing inside the second turn header. As a result, resistance to the cooling water flowing inside the second turn header can be suppressed.

In the above heat exchanger, the first water supply inlet may include the first water supply connection portion (36) inserted into another first water supply inlet, the first water discharge outlet may include the first water discharge connection portion (42) inserted into another first water discharge outlet, the second water supply inlet may include the second water supply connection portion (58) inserted into another second water supply inlet, and the second water discharge outlet may include the second water discharge connection portion (64) inserted into another second water discharge outlet. As a result, it is possible to improve the sealing performance at the connecting portion between the first water supply inlet and another first water supply inlet. In addition, it is possible to improve the sealing performance at the connecting portion between the first water discharge outlet and another first water discharge outlet. Further, it is possible to improve the sealing performance at the connecting portion between the second water supply inlet and another second water supply inlet. Furthermore, it is possible to improve the sealing performance at the connecting portion between the second water discharge outlet and another second water discharge outlet.

The invention claimed is:

1. A heat exchanger that cools a battery cell, the heat exchanger comprising:

a plurality of first heat exchange plates each including a first water jacket through which cooling water flows; and a plurality of second heat exchange plates each including a second water jacket through which the cooling water flows, wherein each of the first heat exchange plates and each of the second heat exchange plates are alternately stacked, the cooling water flows inside the first water jacket and inside the second water jacket in a first direction that is orthogonal to a stacking direction of the first heat exchange plates and the second heat exchange plates, each of the first heat exchange plates includes a first water supply inlet configured to supply the cooling water to the first water jacket, and a first water discharge outlet configured to discharge the cooling water from the first water jacket, each of the second heat exchange plates includes a second water supply inlet configured to supply the cooling water to the second water jacket, and a second water discharge outlet configured to discharge the cooling water from the second water jacket, the second water supply inlet is disposed on an opposite side of the first water jacket and the second water jacket from the first water supply inlet in the first direction, and the second water discharge outlet is disposed on an opposite side of the first water jacket and the second water jacket from the first water discharge outlet in the first direction, in the first direction, the first water discharge outlet is disposed on a same side of the first water jacket as the first water supply inlet, in a second direction that is orthogonal to the stacking direction and the first direction, the first water supply inlet and the first water discharge outlet are disposed at different positions, in the first direction, the second water discharge outlet is disposed on a same side of the second water jacket as the second water supply inlet, and in the second direction, the second water supply inlet and the second water discharge outlet are disposed at different positions.

2. The heat exchanger according to claim 1, wherein the first heat exchange plates each include a first turn header configured to cause the cooling water flowing from the first water supply inlet to flow toward the first water discharge outlet, the first turn header is disposed on an opposite side of the first water jacket from the first water supply inlet and the first water discharge outlet in the first direction, the first turn header is formed in a curved surface shape protruding toward an outer side of the first heat exchange plate in the first direction, the second heat exchange plates each include a second turn header configured to cause the cooling water flowing from the second water supply inlet to flow toward the second water discharge outlet, the second turn header is disposed on an opposite side of the second water jacket from the second water supply inlet and the second water discharge outlet in the first direction, and the second turn header is formed in a curved surface shape protruding toward an outer side of the second heat exchange plate in the first direction.

3. A heat exchanger that cools a battery cell, the heat exchanger comprising:

a plurality of first heat exchange plates each including a first water jacket through which cooling water flows; and a plurality of second heat exchange plates each including a second water jacket through which the cooling water flows, wherein each of the first heat exchange plates and each of the second heat exchange plates are alternately stacked, the cooling water flows inside the first water jacket and inside the second water jacket in a flow direction that is orthogonal to a stacking direction of the first heat exchange plates and the second heat exchange plates, each of the first heat exchange plates includes a first water supply inlet configured to supply the cooling water to the first water jacket, and a first water discharge outlet configured to discharge the cooling water from the first water jacket, each of the second heat exchange plates includes a second water supply inlet configured to supply the cooling water to the second water jacket, and a second water discharge outlet configured to discharge the cooling water from the second water jacket, the second water supply inlet is disposed on an opposite side of the first water jacket and the second water jacket from the first water supply inlet in the flow direction, the second water discharge outlet is disposed on an opposite side of the first water jacket and the second water jacket from the first water discharge outlet in the flow direction, the first water supply inlet of each of the first heat exchange plates includes a first water supply connection portion configured to be inserted into the first water supply inlet of another one of the first heat exchange plates, the first water discharge outlet of each of the first heat exchange plates includes a first water discharge connection portion configured to be inserted into the first water discharge outlet of another one of the first heat exchange plates, the second water supply inlet of each of the second heat exchange plates includes a second water supply connection portion configured to be inserted into the second water supply inlet of another one of the second heat exchange plates, and the second water discharge outlet of each of the second heat exchange plates includes a second water discharge connection portion configured to be inserted into the second water discharge outlet of another one of the second heat exchange plates.

4. The heat exchanger according to claim 2, wherein the first turn header includes a first recess portion that engages the second water supply inlet, and a second recess portion that engages the second water discharge outlet, and the second turn header includes a third recess portion that engages the first water supply inlet, and a fourth recess portion that engages the first water discharge outlet.

5. The heat exchanger according to claim 4, wherein the first recess portion and the second recess portion are provided at opposite end portions of the second turn header in the second direction, and the third recess portion and the fourth recess portion are provided at opposite end portions of the second turn header in the second direction.

6. The heat exchanger according to claim 2, further comprising:

a first water supply/discharge header that includes the first water supply inlet and the first water discharge outlet; and a second water supply/discharge header that includes the second water supply inlet and the second water discharge outlet, wherein when viewed from the stacking direction, the first turn header at least partially overlaps the second water supply/discharge header whereas the second turn header at least partially overlaps the first water supply/discharge header.

* * * * *